US012432487B2

(12) United States Patent
Zhang et al.

(10) Patent No.: US 12,432,487 B2
(45) Date of Patent: Sep. 30, 2025

(54) ULTRASONIC LOUDSPEAKER

(71) Applicant: BESTAR Holdings Co., Ltd., Changzhou (CN)

(72) Inventors: Yonglei Zhang, Changzhou (CN); Rufei Wang, Changzhou (CN); Yifei Wu, Changzhou (CN)

(73) Assignee: BESTAR Holdings Co., Ltd., Changzhou (CN)

( * ) Notice: Subject to any disclaimer, the term of this patent is extended or adjusted under 35 U.S.C. 154(b) by 0 days.

(21) Appl. No.: 19/202,343

(22) Filed: May 8, 2025

(65) Prior Publication Data

US 2025/0267393 A1 Aug. 21, 2025

Related U.S. Application Data

(63) Continuation of application No. PCT/CN2024/088023, filed on Apr. 16, 2024.

(30) Foreign Application Priority Data

Dec. 29, 2023 (CN) ......................... 202311842254.3

(51) Int. Cl.
*H04R 1/24* (2006.01)
*H04R 1/06* (2006.01)
(Continued)

(52) U.S. Cl.
CPC ................. *H04R 1/24* (2013.01); *H04R 1/06* (2013.01); *H04R 7/18* (2013.01); *H04R 9/025* (2013.01);
(Continued)

(58) Field of Classification Search
CPC .......... H04R 23/02; H04R 9/025; H04R 7/12; H04R 17/00; H04R 9/06; H04R 9/046;
(Continued)

(56) References Cited

U.S. PATENT DOCUMENTS 10,237,661 B2 * 3/2019 Cai ........................ H04R 23/02
10,609,461 B1 * 3/2020 Lo ............................ H04R 7/18
(Continued)

FOREIGN PATENT DOCUMENTS

CN 103814586 A 5/2014
CN 113573217 A 10/2021
(Continued)

*Primary Examiner* — Gerald Gauthier
*Assistant Examiner* — Julie X Dang
(74) *Attorney, Agent, or Firm* — Nitin Kaushik

(57) ABSTRACT

The present invention relates to the technical field of electroacoustics, and in particular to an ultrasonic loudspeaker comprising: a magnetic circuit system for providing the loudspeaker with a magnetic field; a frame provided in a hollow way, the magnetic circuit system being fixed in the frame; an FPC lapped and fixed on the frame, a portion of the FPC in a hollow portion of the frame being elastic; a diaphragm attached and fixed to the FPC in parallel; a voice coil with a top fixed to the FPC and a remaining portion extending into the hollow portion of the frame; and an ultrasonic driver fixed to the FPC and attached and connected to the diaphragm. When powered, the voice coil drives the diaphragm via the FPC to generate first sound pressure while the ultrasonic driver produces second sound pressure, their combination forming ultrasonic grade frequency response for high-resolution audio reproduction.

7 Claims, 12 Drawing Sheets

(51) Int. Cl.

| | |
|---|---|
| ***H04R 7/18*** | (2006.01) |
| ***H04R 9/02*** | (2006.01) |
| ***H04R 9/04*** | (2006.01) |
| ***H04R 9/06*** | (2006.01) |
| ***H04R 17/00*** | (2006.01) |

(52) U.S. Cl.
CPC ............... *H04R 9/045* (2013.01); *H04R 9/06* (2013.01); *H04R 17/00* (2013.01); *H04R 2400/11* (2013.01)

(58) Field of Classification Search
CPC ........ H04R 31/006; H04R 1/24; H04R 9/063; H04R 1/06; H04R 7/18; H04R 9/045
USPC .......................................... 381/182, 400–424
See application file for complete search history.

(56) References Cited

U.S. PATENT DOCUMENTS

| | | | | |
|---|---|---|---|---|
| 11,490,206 | B1 * | 11/2022 | Hsu | H04R 9/043 |
| 2003/0063767 | A1 * | 4/2003 | Dedieu | H04R 1/225 381/345 |
| 2013/0315433 | A1 * | 11/2013 | Zhao | H04R 1/028 381/386 |
| 2014/0241566 | A1 * | 8/2014 | Choi | H04R 9/043 381/400 |
| 2016/0219373 | A1 | 7/2016 | Qutub et al. | |
| 2018/0035213 | A1 * | 2/2018 | Shan | H04R 9/06 |
| 2018/0098157 | A1 * | 4/2018 | Li | H04R 7/04 |
| 2018/0109879 | A1 * | 4/2018 | Cai | H04R 23/02 |
| 2020/0045445 | A1 * | 2/2020 | Feng | H04R 9/06 |
| 2023/0179921 | A1 * | 6/2023 | Song | H04R 9/043 381/398 |

FOREIGN PATENT DOCUMENTS

| | | |
|---|---|---|
| JP | 2021010155 A | 1/2021 |
| WO | WO0018182 A1 | 3/2000 |

* cited by examiner

ULTRASONIC LOUDSPEAKER

CROSS-REFERENCE TO RELATED APPLICATIONS

The application claims priority to Chinese patent application No. 2023118422543, filed on Dec. 29, 2023, the entire contents of which are incorporated herein by reference.

TECHNICAL FIELD

The present invention relates to the technical field of electroacoustics, and in particular to an ultrasonic loudspeaker.

BACKGROUND

With the advancement of science and technology and the development of multimedia technologies, the quality requirements of electronic products for audios are increasing during the pursuit of more convenient operation, faster response, and clearer picture quality. An existing moving coil type loudspeaker usually includes a coil and a diaphragm that are coupled together, as well as a magnet for providing a magnetic field. When energized, the coil drives the diaphragm to vibrate therewith to produce a sound. However, the loudspeaker in such a structure is insufficient in high-frequency response, which greatly affects the listening experience of users.

In the prior art, in order to improve the high-frequency response effect in the loudspeaker, it is started to add a piezoelectric drive assembly to the loudspeaker. For example, a US patent application with Publication Number US20160219373A1 discloses on Jul. 28, 2016 a piezoelectric speaker driver, in which a piezoelectric driver is disposed near a loudspeaker, and the piezoelectric driver moves to drive the loudspeaker to vibrate, such that a sound energy is produced in a target frequency range to achieve the effect of enhancing the target frequency and improving the high-frequency response.

However, the inventor has found that the coupling effect of the piezoelectric driver and the loudspeaker is not desirable in the above structural form, making it impossible to precisely restore a high-resolution sound source.

SUMMARY

In view of at least one of the above technical problems, the present invention provides an ultrasonic loudspeaker to improve the frequency response of the loudspeaker by means of structural improvement.

According to a first aspect of the present invention, an ultrasonic loudspeaker is provided. The ultrasonic loudspeaker includes:

- a magnetic circuit system for providing the loudspeaker with a magnetic field;
- a frame provided in a hollow way, the magnetic circuit system being fixed in the frame;
- an FPC lapped and fixed on the frame, a portion of the FPC in a hollow portion of the frame being elastic;
- a diaphragm attached and fixed to the FPC in parallel;
- a voice coil with a top fixed to the FPC and a remaining portion extending into the hollow portion of the frame, the voice coil being arranged in the frame in a relatively vibratable way; and

- an ultrasonic driver fixed to the FPC and attached and connected to the diaphragm;
- wherein the voice coil, when energized, drives the diaphragm to vibrate by means of the FPC to produce a first sound pressure, and at the same time, the ultrasonic driver is energized to drive the diaphragm to produce a second sound pressure, and the first sound pressure and the second sound pressure are combined to form an ultrasonic grade frequency response.

In some embodiments of the present invention, the FPC includes an outer border, an inner border and elastic arms connected between the outer border and the inner border, the voice coil is fixed to the inner border, and the outer border is fixed to the frame.

In some embodiments of the present invention, the inner border is further provided with two connecting bridges arranged in parallel, both ends of the two connecting bridges are fixedly connected to two opposing edges of the inner border, respectively, the ultrasonic driver is a piezoelectric plate, and both ends of the ultrasonic driver are fixed to the two connecting bridges, respectively.

In some embodiments of the present invention, portions of the two connecting bridges connected to the ultrasonic driver are sunk at a depth equal to a thickness of the ultrasonic driver.

In some embodiments of the present invention, the FPC is further provided with a first line to be led out for the ultrasonic driver and a second line to be led out for the voice coil, the first line is led out from the connecting bridges to the outer border via the inner border and the elastic arms, and the second line is led out from the inner border to the outer border via the elastic arms.

In some embodiments of the present invention, a reinforcement plate is further provided between the FPC and the diaphragm, one surface of the reinforcement plate is attached and connected to the diaphragm, and the other surface of the reinforcement plate is attached and connected to the inner border and the ultrasonic driver at the same time.

In some embodiments of the present invention, connecting electrodes for connection with the first line and the second line are further disposed on the frame by integral injection molding, and the connecting electrodes extend from an upper surface of the frame to a lower surface of the frame.

In some embodiments of the present invention, the magnetic circuit system includes magnetic steel, a magnetic bowl and a pole piece, the magnetic bowl is fixed on the frame, and a vibration space allowing for vibration of the voice coil is formed between the magnetic bowl and the magnetic steel.

In some embodiments of the present invention, a side wall of the magnetic bowl is upturned and extends to a plane where the pole piece is located.

In some embodiments of the present invention, a surface of the pole piece facing the FPC is provided with recesses allowing for vibration of the ultrasonic driver.

The beneficial effects of the present invention are as follows: according to the present invention, the voice coil and the ultrasonic driver are both fixed to the FPC, and the FPC is attached and connected to the diaphragm in parallel, such that the vibration of the voice coil and the vibration of the ultrasonic driver are both transmitted to the diaphragm by means of the FPC, and thus the first sound pressure produced by the vibration of the voice coil and the second sound pressure produced by the vibration of the ultrasonic driver are better coupled to form the ultrasonic grade frequency response, allowing for restoration of a higher-resolution audio.

BRIEF DESCRIPTION OF DRAWINGS

To describe the technical solutions in the embodiments of the present invention or in the prior art more clearly, the following briefly introduces the accompanying drawings to be used in the description of the embodiments or the prior art. Obviously, the accompanying drawings in the following description show merely some embodiments stated in the present invention, and a person of ordinary skill in the art may still derive other drawings from these accompanying drawings without creative efforts.

DETAILED DESCRIPTION OF THE EMBODIMENTS

The technical solutions in the embodiments of the present invention will be described clearly and completely below in conjunction with the accompanying drawings in the embodiments of the present invention. Obviously, the embodiments described are merely some instead of all of the embodiments of the present invention.

It should be noted that when an element is referred to as being "fixed to" another element, said element may be directly disposed on said another element, or there may be an intermediate element therebetween. When an element is referred to as being "connected to" another element, said element may be directly attached to said another element, or there may be an intermediate element therebetween at the same time. The terms "perpendicular", "horizontal", "left", "right" and similar expressions as used herein are for an illustrative purpose, instead of indicating a unique implementation.

Unless otherwise defined, all technical and scientific terms as used herein have the same meanings as those commonly understood by those skilled in the art of the present invention. The terms used in the specification of the present invention are only for the purpose of describing specific embodiments, and are not intended to limit the present invention. The term "and/or" as used herein includes any and all combinations of one or more of relevant listed items.

Figure 1:
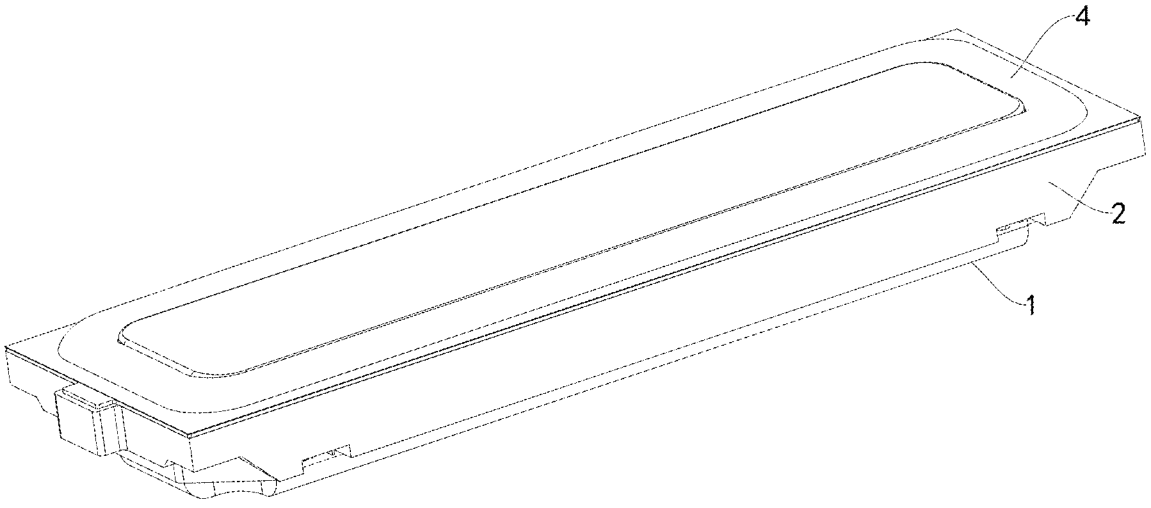
FIG. 1 shows a schematic structural diagram of an ultrasonic loudspeaker according to an embodiment of the present invention.
Figure 2:
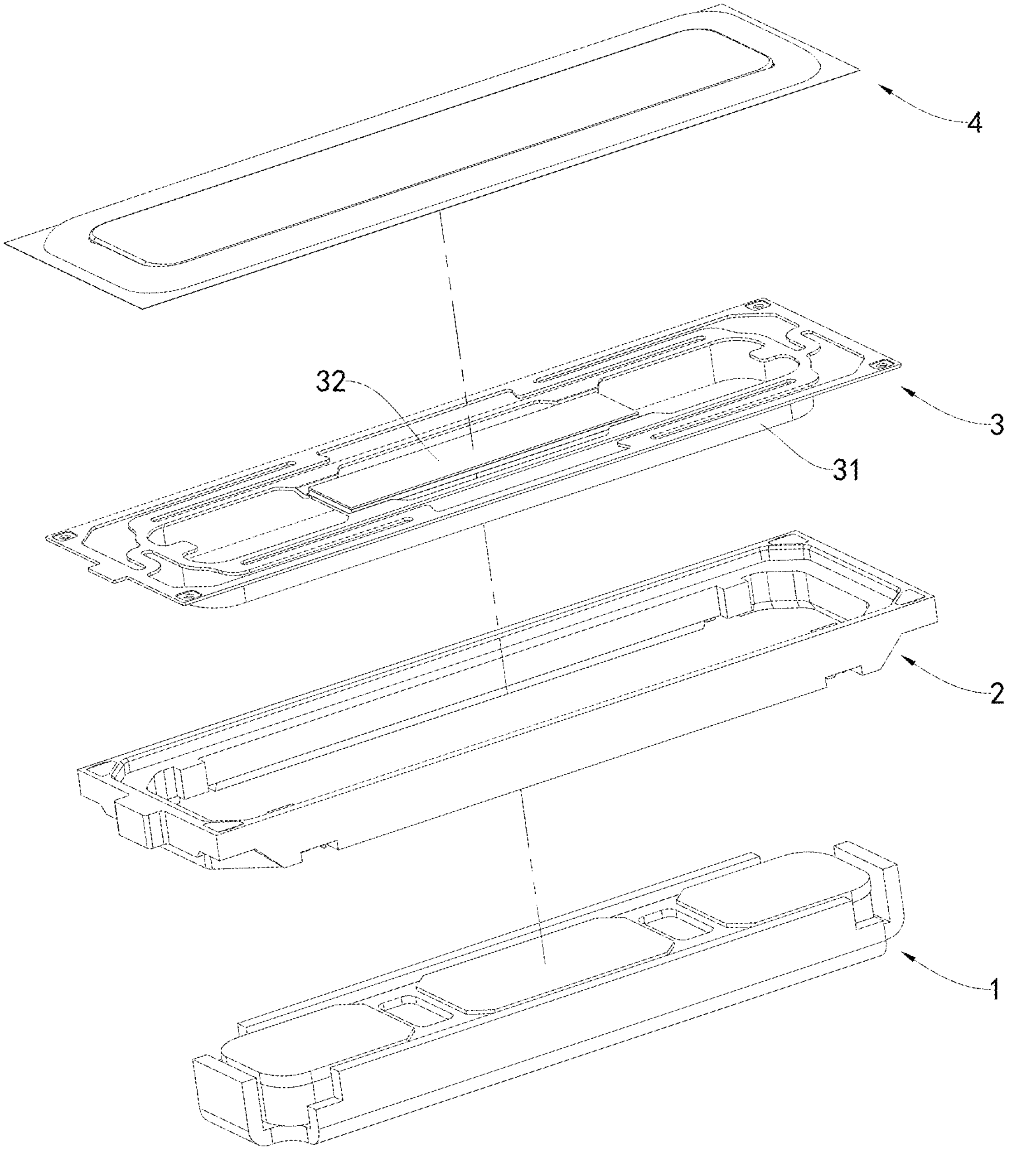
FIG. 2 shows a schematic exploded structural diagram of an ultrasonic loudspeaker according to an embodiment of the present invention.

As shown in FIG. 1 to FIG. 11, an ultrasonic loudspeaker includes a magnetic circuit system 1, a frame 2, an FPC 3, a voice coil 31, an ultrasonic driver 32, and a diaphragm 4. As shown in FIG. 2, the magnetic circuit system 1 is used to provide the loudspeaker with a magnetic field, in which the voice coil 31 vibrates when energized. It should be noted here that the magnetic circuit system 1 has a variety of forms in the prior art, for example, the magnetic circuit system may consist of a single main magnetic block, or may be in a structural form of a main magnetic block and an auxiliary magnetic block.

The frame 2 is provided in a hollow way, and the magnetic circuit system 1 is fixed in the frame 2. In an embodiment of the present invention, the frame 2 serves to fix the magnetic circuit system 1 in one aspect, and to provide a support for fixing the FPC 3 and the diaphragm 4. During actual fixation, the peripheries of the FPC 3 and diaphragm 4 are lapped and fixed to the edge of the frame 2, enabling middle portions to vibrate in the height direction of the frame 2. In an embodiment of the present invention, in addition to fixation of the above components, the frame 2 serves to lead out a circuit, which will be specifically introduced below.

Figure 3:
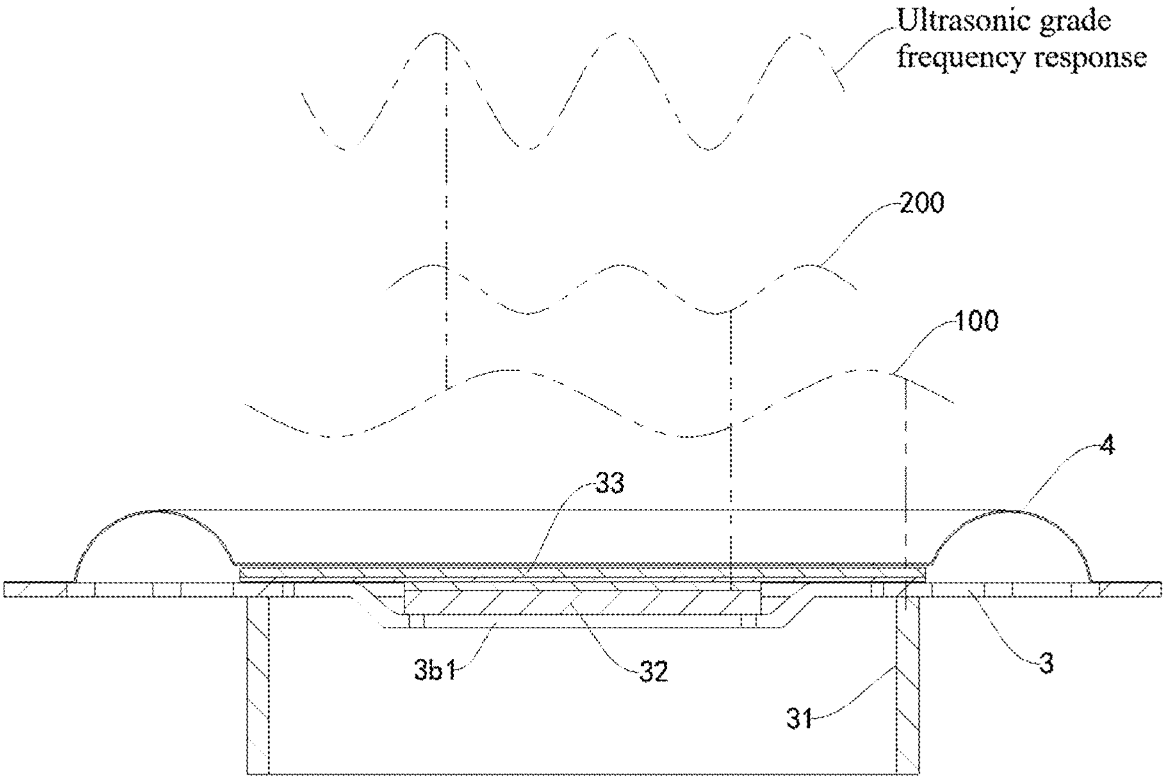
FIG. 3 shows a schematic structural diagram of sound production by a diaphragm according to an embodiment of the present invention.

In the embodiment of the present invention, the FPC 3 refers to a flexible printed circuit board that is lapped and fixed to the frame 2, and the portion of the FPC 3 in the hollow portion of the frame 2 is elastic. In some embodiments of the present invention, the base material of the FPC 3 may be selected as PI. In an embodiment of the present invention, more importantly, the FPC 3 serves as a uniform vibration source to drive the diaphragm 4 in addition to its transmission function as a circuit, as shown in FIG. 2. In an embodiment of the present invention, the diaphragm 4 is attached and fixed to the FPC 3 in parallel; and the top of the voice coil 31 is fixed to the FPC 3, and the remaining portion of the voice coil extends into the hollow portion of the frame 2, in which the voice coil 31 is arranged in a relatively vibratable way; and the ultrasonic driver 32 is fixed to the FPC 3 and attached and connected to the diaphragm 4. That is, as shown in FIG. 3, in an embodiment of the present invention, the voice coil 31 is fixed to the bottom of the FPC 3, the ultrasonic driver 32 is fixed to the FPC 3, and in such an arrangement, the vibration of the diaphragm 4 is transmitted by means of the FPC 3. Referring to the vibration curves in FIG. 3, during actual driving of the diaphragm 4, the voice coil 31, when energized, drives the diaphragm 4 to vibrate by means of the FPC 3 to produce a first sound pressure 100, the ultrasonic driver 32 is energized to drive the diaphragm 4 to produce a second sound pressure 200 at the same time, and the first sound pressure 100 and the second sound pressure 200 are combined to form an ultrasonic grade frequency response. In the prior art, the ultrasonic driver is either directly attached to a voice diaphragm, or disposed near the entire loudspeaker. This fixation mode, however, has a bad vibration transmission effect, or may cause deformation of the voice diaphragm and problematic connection reliability, leading to an undesirable sound pressure coupling effect. In the embodiment of the present invention, with the FPC 3 acting as the vibration source, the voice coil 31 vibrates to drive the FPC 3 to vibrate, and the ultrasonic driver 32 fixed to the FPC 3 also drives the FPC 3 to vibrate. Since the FPC 3 is directly attached to the diaphragm 4, the vibration can be directly transmitted to the diaphragm 4, and since the ultrasonic driver 32 is fixed to the FPC 3 and sandwiched between the diaphragm 4 and the FPC 3 at the same time, a good fixing effect can be achieved.

In the above embodiment, the voice coil 31 and the ultrasonic driver 32 are both fixed to the FPC 3, and the FPC 3 is attached and connected to the diaphragm 4 in parallel, such that the vibration of the voice coil 31 and the vibration of the ultrasonic driver 32 are both transmitted to the diaphragm 4 by means of the FPC 3, and thus the first sound pressure 100 produced by the vibration of the voice coil 31 and the second sound pressure 200 produced by the vibration of the ultrasonic driver 32 are better coupled to form the ultrasonic grade frequency response, allowing for restoration of a higher-resolution audio.

Figure 4:
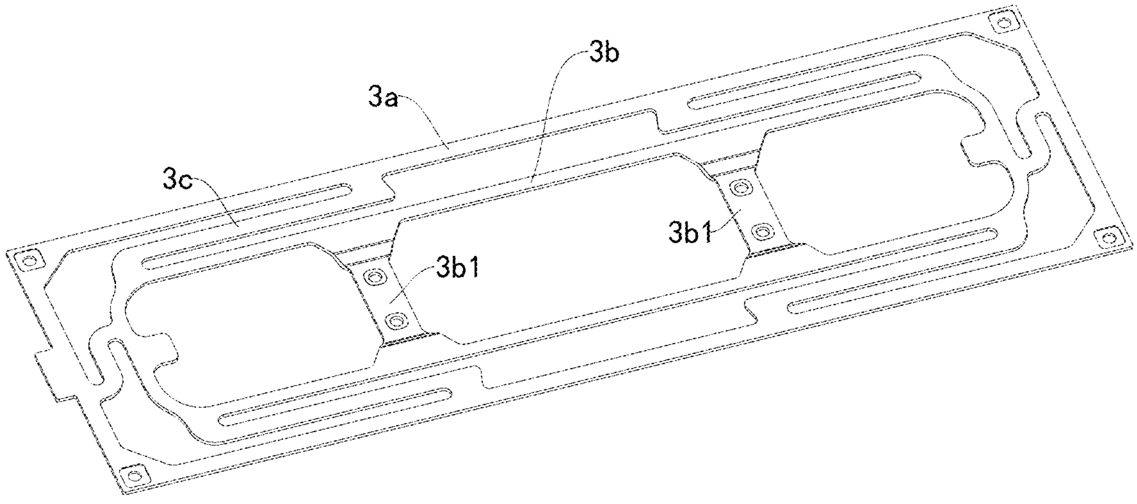
FIG. 4 shows a schematic structural diagram of an FPC according to an embodiment of the present invention.

Based on the above embodiment, in an embodiment of the present invention, the specific structure of the FPC 3 is shown in FIG. 4. The FPC 3 includes an outer border 3*a*, an inner border 3*b*, and elastic arms 3*c* connected between the outer border 3*a* and the inner border 3*b*, the voice coil 31 is fixed to the inner border 3*b*, and the outer border 3*a* is fixed to the frame 2. With the connection via the elastic arms 3*c*, the inner border 3*b* is enabled to vibrate up and down relative to the plane where the outer border 3*a* is located. In addition, it should be noted here that, in some embodiments of the present invention, the elastic arm 3*c* has a variety of structural forms, and it may be an S-shaped elastic arm 3*c* shown in FIG. 4, or a further form.

Figure 5:
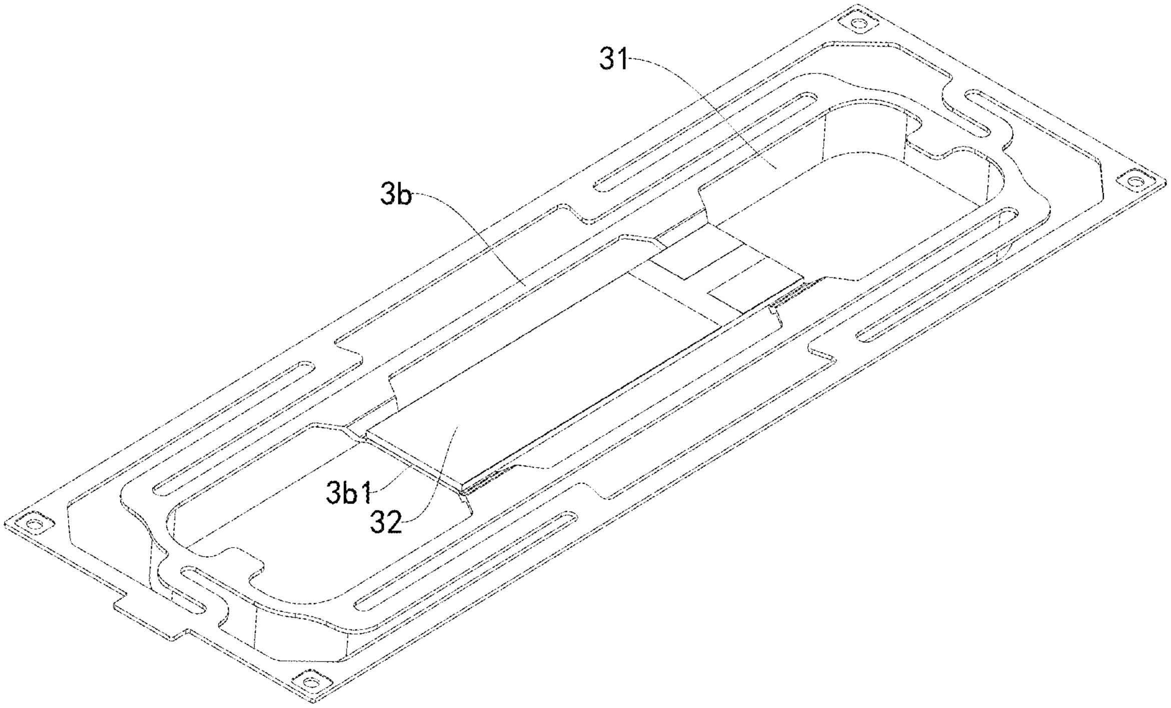
FIG. 5 shows a schematic diagram of a structure for connecting an FPC to a voice coil and an ultrasonic driver according to an embodiment of the present invention.

In an embodiment of the present invention, the ultrasonic driver 32 is a piezoelectric plate. Based on the characteristics of a ceramic piezoelectric plate, however, a strip-shaped platy ceramic piezoelectric plate produces a transverse stretching vibration, i.e., stretching vibration along a length direction of the piezoelectric plate, when a planned direction and an exciting electric field are both along a thickness direction of the striped-shaped platy ceramic piezoelectric plate. In this vibration mode, if the ceramic piezoelectric plate is directly attached to the diaphragm 4, the diaphragm 4 may be caused to deform in the length direction, such that the vibration in the thickness direction cannot be provided. In an embodiment of the present invention, in order to convert the stretching vibration of the piezoelectric plate in the length direction into the vibration in the thickness direction, as shown in FIG. 4 and FIG. 5, the inner border 3*b* is further provided two connecting bridges 3*b*1 arranged in parallel, both ends of the two connecting bridges 3*b*1 are fixedly connected to two opposing edges of the inner border 3*b*, respectively, and both ends of the ultrasonic driver 32 are fixed to the two connecting bridges 3*b*1, respectively. With the fixation mode where both ends of the piezoelectric plate are fixed and the middle portion of the piezoelectric plate is suspended, the stretching vibration of the piezoelectric plate can be changed to the vertical vibration mode in the thickness direction of the piezoelectric plate. That is, both ends of the piezoelectric plate are fixed, and then, the stretching vibration of the piezoelectric plate in the length direction is converted into the bending vibration in the thickness direction, thereby achieving better vibration transmission.

Based on the above embodiment, in an embodiment of the present invention, continuing to refer to FIG. 3 to FIG. 5, the portions of the two connecting bridges 3*b*1 connected to the ultrasonic driver 32 are sunk at a depth equal to the thickness of the ultrasonic driver 32. With such a structural form of arrangement, the upper surface of the piezoelectric plate is flush with the upper surface of the inner border 3*b*, such that better vibration transmission is achieved in the thickness direction.

Figure 6:
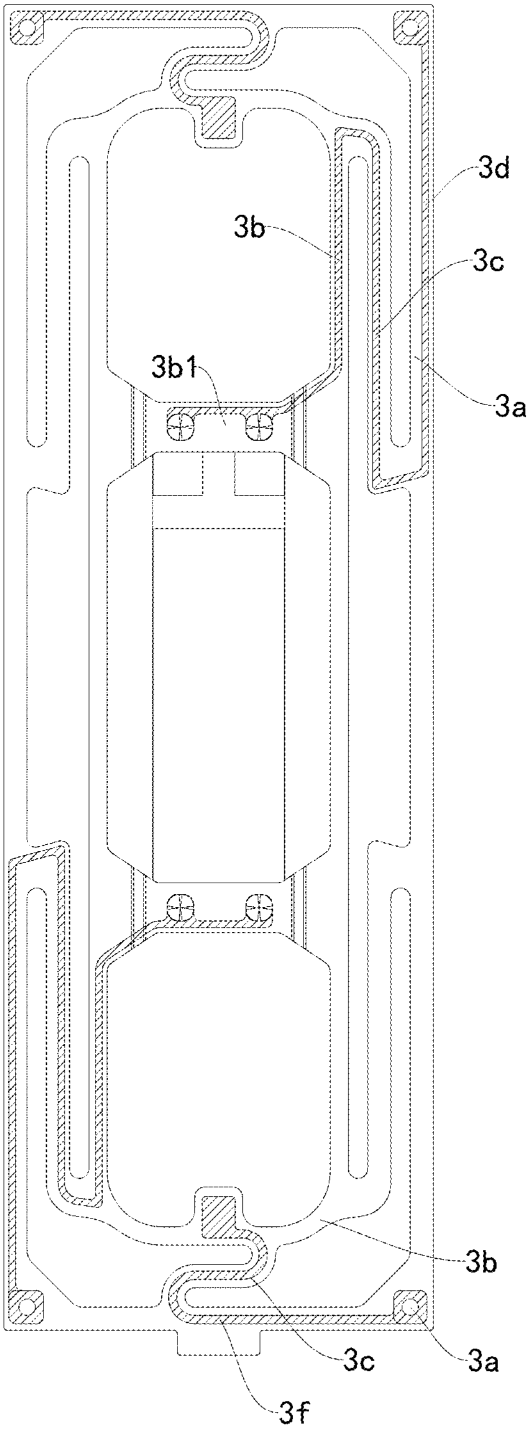
FIG. 6 shows a main view of an FPC according to an embodiment of the present invention.

In an embodiment of the present invention, the FPC 3 serves to lead out a line in addition to its effects of transmitting the vibration, converting the vibration mode of the piezoelectric plate and fixing. Specifically, as shown in FIG. 6, the FPC 3 is further provided with a first line 3*d* to be led out for the ultrasonic driver 32 and a second line 3*f* to be led out for the voice coil 31, the first line 3*d* is led out from the connecting bridges 3*b*1 to the outer border 3*a* via the inner border 3*b* and the elastic arms 3*c*, and the second line 3*f* is led out from the inner border 3*b* to the outer border 3*a* via the elastic arms 3*c*. During actual connection, the led-in and led-out lines of the voice coil 31 are arranged at two ends in the length direction, and then connected to the second line 3*f* at both ends of the inner border 3*b* in the length direction, without an external line to lead out the line of the voice coil 31. The ultrasonic driver 32 is fixed to the connecting bridges 3*b*1 by welding and then led out to the edge of the outer border 3*a* via the first line 3*d*. It should be noted here that, in some embodiments of the present invention, the first line 3*d* and the second line 3*f* are both printed on the substrate of the FPC 3 by printing.

Figure 7:
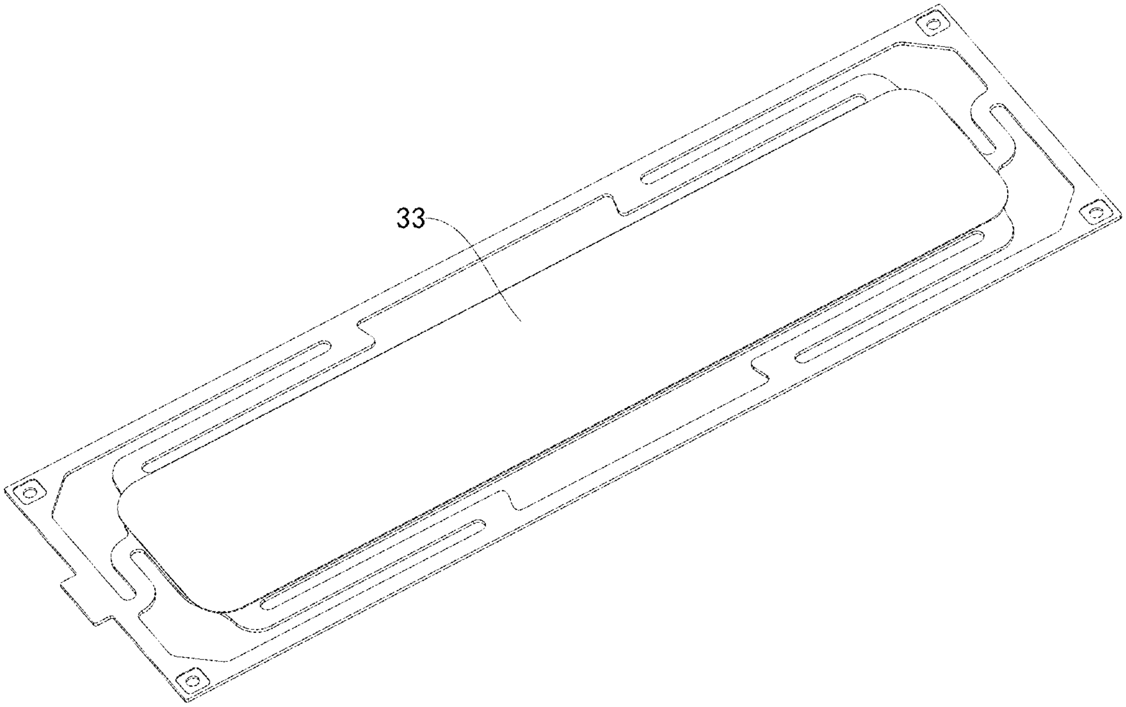
FIG. 7 shows a schematic diagram of a structure for connecting an FPC to a reinforcement plate according to an embodiment of the present invention.
Figure 12:
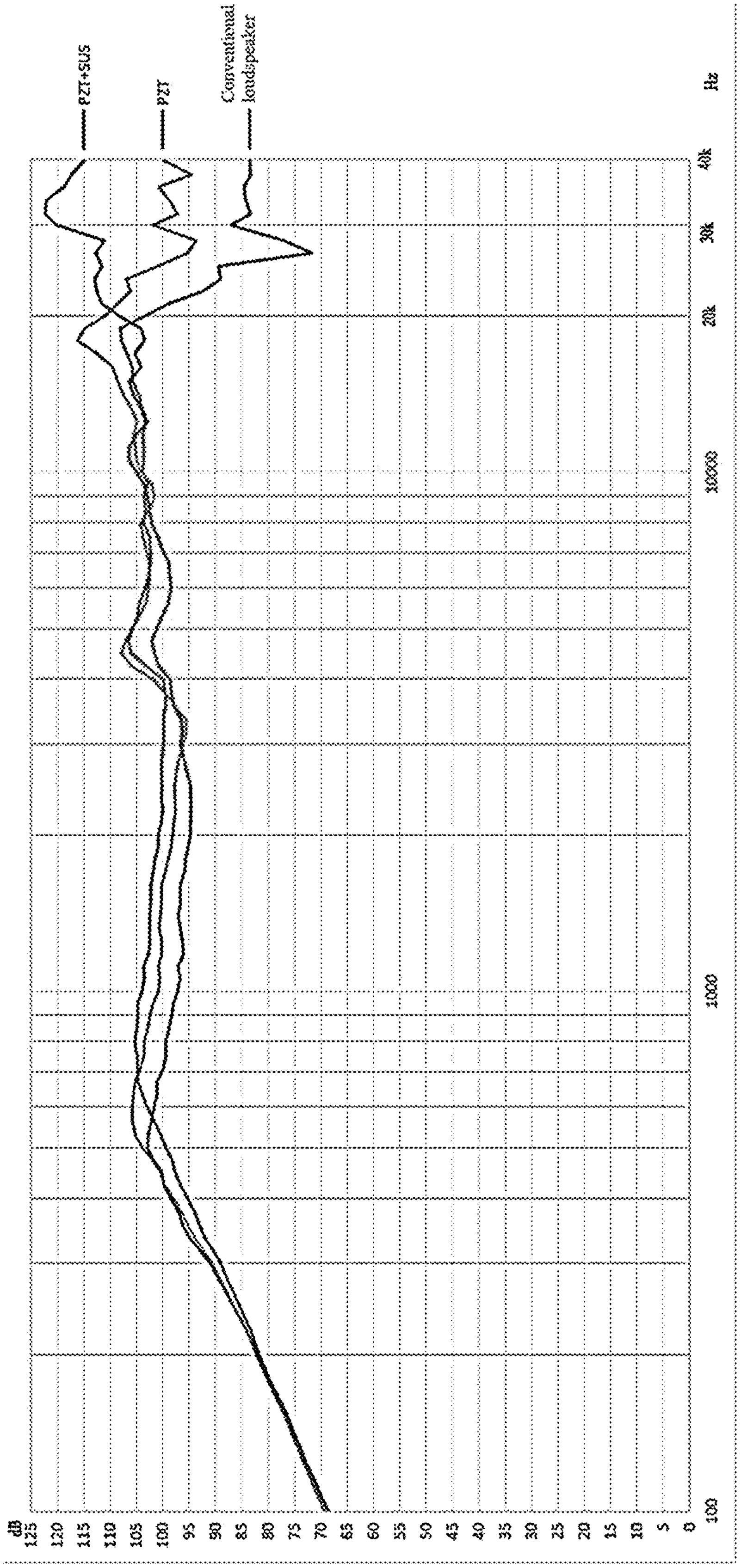
FIG. 12 shows a sound pressure-frequency curve chart of a conventional loudspeaker and ultrasonic loudspeakers before and after addition of a reinforcement plate according to an embodiment of the present invention.

Continuing to refer to FIG. 3 and FIG. 7, in an embodiment of the present invention, a reinforcement plate 33 is further provided between the FPC 3 and the diaphragm 4, one surface of the reinforcement plate 33 is attached and connected to the diaphragm 4, and the other surface of the reinforcement plate 33 is attached and connected to the inner border 3*b* and the ultrasonic driver 32 at the same time In an embodiment of the present invention, the reinforcement plate is made of a material with higher hardness, for example, a stainless-steel plate, and the arrangement of the high-hardness material between the FPC 3 and the diaphragm 4 can improve the frequency response of the diaphragm 4, as shown in FIG. 12. In an embodiment of the present invention, the ultrasonic loudspeaker added with the reinforcement plate 33 achieves a frequency response in an ultra-wide band, with a high frequency up to above 40 K. With such an arrangement, in the ultrasonic loudspeaker of the present invention, the voice coil 31 is responsible for low frequency and medium frequency, and the piezoelectric plate compensates for the voice coil 31 at the medium to high frequency. In this way, when the sound is played out, the mellow, full and transparent human sound is presented for the high-frequency tone, showing stronger sense of impact and more thrilling sound.

Figure 8:
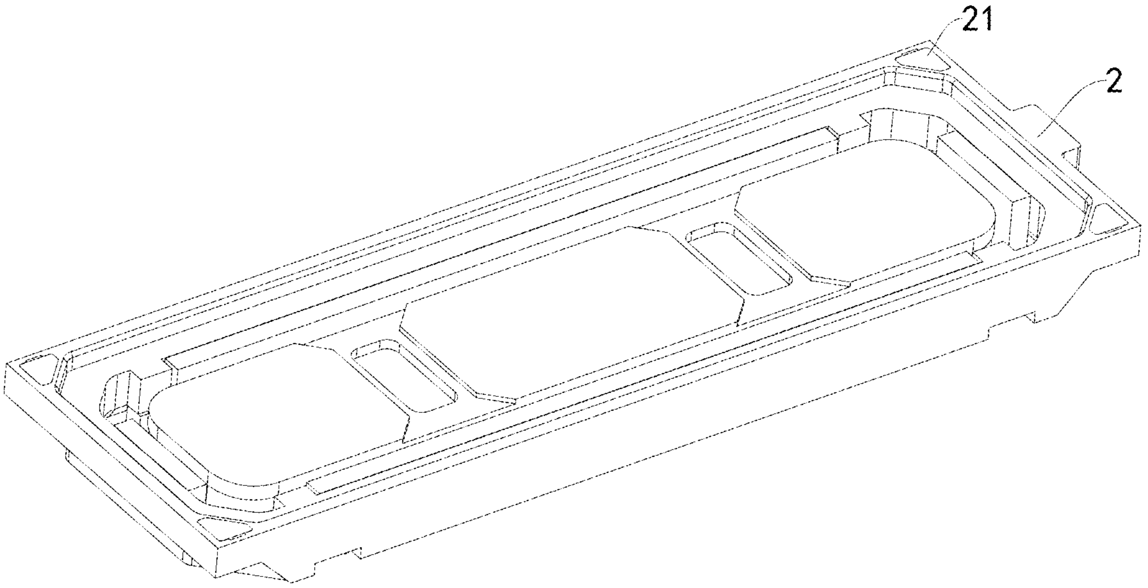
FIG. 8 shows a schematic diagram of a structure for connecting a frame to a magnetic circuit system according to an embodiment of the present invention.
Figure 9:
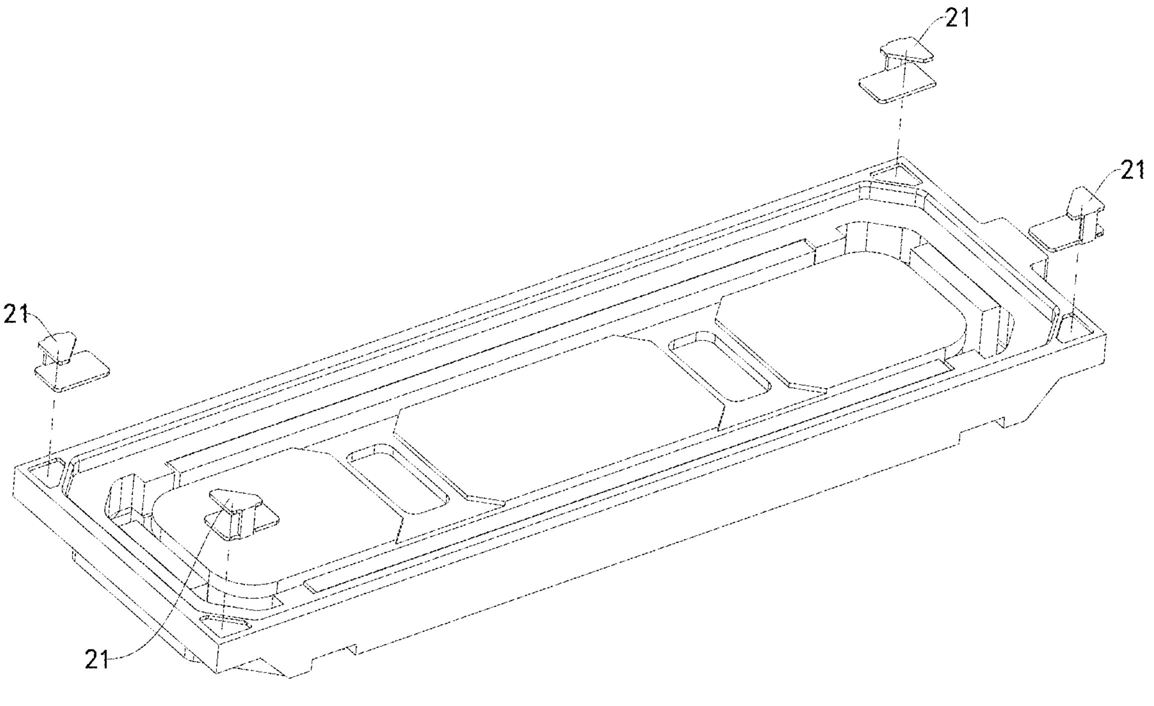
FIG. 9 shows a schematic exploded structural diagram of connecting electrodes on a frame according to an embodiment of the present invention.

As shown in FIG. 8 and FIG. 9, in an embodiment of the present invention, connecting electrodes 21 for connection with the first line 3*d* and the second line 3*f* are further disposed on the frame 2 by integral injection molding, and the connecting electrodes 21 extend from the upper surface of the frame 2 to the lower surface of the frame 2. With such an arrangement, once lapped and fixed to the frame 2, the FPC 3 is connected to the connecting electrodes 21 on the frame 2, and the lines are then led out to four corners at the bottom of the frame 2, such that the footprint of the loudspeaker is further reduced in such an arrangement.

In an embodiment of the present invention, the specific structure of the magnetic circuit system 1 is shown in FIG.

Figure 11:
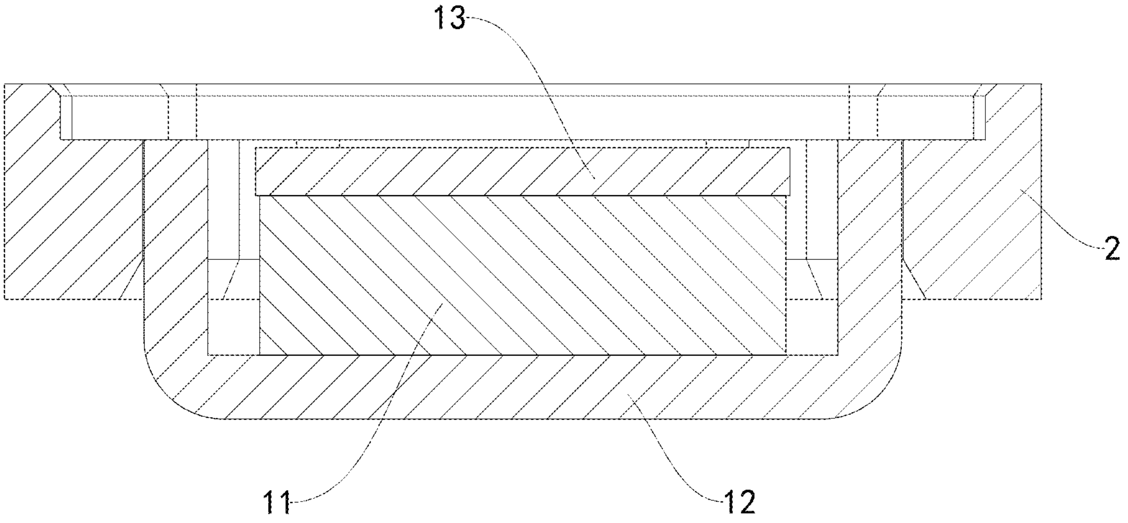
FIG. 11 shows a cross-sectional view of connection between the frame and the magnetic circuit system according to an embodiment of the present invention.

10 and FIG. 11. The magnetic circuit system 1 includes magnetic steel 11, a magnetic bowl 12 and a pole piece 13, the magnetic bowl 12 is fixed to the frame 2, and a vibration space allowing for vibration of the voice coil 31 is formed between the magnetic bowl 12 and the magnetic steel 11. In this way, the space allowing for vertical vibration of the voice coil 31 is formed between the inner wall of the magnetic bowl 12 and the outer walls of the magnetic steel 11 and pole piece 13, such that the intensity of the magnetic field is uniform, and moreover, the space occupation is further reduced.

In an embodiment of the present invention, the structure of the magnetic bowl 12 is further improved. Continuing to refer to FIG. 10 and FIG. 11, the side wall of the magnetic bowl 12 is upturned and extends to the plane where the pole piece 13 is located. With the upturned side wall of the magnetic bowl 12, the lines of magnetic induction on the magnetic steel 11 are directed to the upper surface of the side wall close to the pole piece 13 via the magnetic bowl 12, to subsequently develop a stronger magnetic field between the pole piece 13 and the upper surface of the side wall of the magnetic bowl 12, such that a better magnetic field basis is provided for the vibration of the voice coil 31, and the occurrence of magnetic flux leakage is also reduced at the same time by means of the above arrangement of the magnetic bowl 12.

Figure 10:
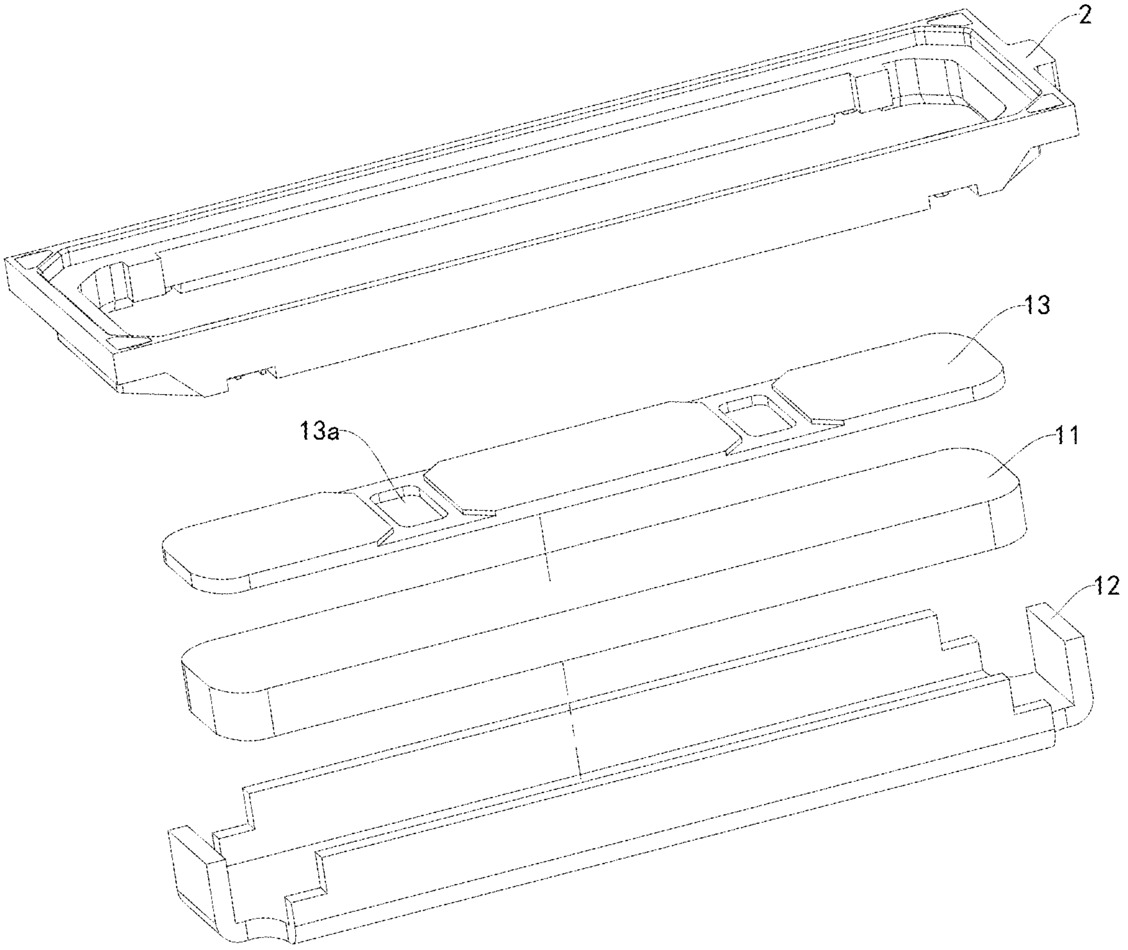
FIG. 10 shows a schematic exploded structural diagram of connection between a frame and a magnetic circuit system according to an embodiment of the present invention.

Based on the above embodiment, referring to FIG. 10, in an embodiment of the present invention, the surface of the pole piece 13 facing the FPC 3 is provided with recesses 13*a* allowing for vibration of the ultrasonic driver 32. With the arrangement of the recesses 13*a*, a lower space is reserved for the vibration of the ultrasonic driver 32. Certainly, it should be noted here that, in an embodiment of the present invention, the vibration mode of the driver may be two-end vibration or middle vibration, bot of which shall fall within the protection scope of the present invention.

Those skilled in the industry should understand that the present invention is not limited by the embodiments described above. The description in the above embodiments and specification only illustrates the principle of the present invention. Without departing from the spirit and scope of the present invention, it is also possible to make a variety of variations and improvements to the present invention. These variations and improvements shall fall within the scope claimed by the present invention. The scope claimed by the present invention is subject to the appended claims and equivalents thereof.

What is claimed is:

1. An ultrasonic loudspeaker, comprising:

a magnetic circuit system for providing the loudspeaker with a magnetic field;

a frame provided in a hollow way, the magnetic circuit system being fixed in the frame;

an FPC lapped and fixed on the frame, a portion of the FPC in a hollow portion of the frame being elastic;

a diaphragm attached and fixed to the FPC in parallel;

a voice coil with a top fixed to the FPC and a remaining portion extending into the hollow portion of the frame, the voice coil being arranged in the frame in a relatively vibratable way; and an ultrasonic driver fixed to the FPC and attached and connected to the diaphragm;

wherein the voice coil, when energized, drives the diaphragm to vibrate by means of the FPC to produce a first sound pressure, and at the same time, the ultrasonic driver is energized to drive the diaphragm to produce a second sound pressure, and the first sound pressure and the second sound pressure are combined to form an ultrasonic grade frequency response;

wherein the FPC comprises an outer border, an inner border and elastic arms connected between the outer border and the inner border, the voice coil is fixed to the inner border, and the outer border is fixed to the frame;

wherein the inner border is further provided with two connecting bridges arranged in parallel, both ends of the two connecting bridges are fixedly connected to two opposing edges of the inner border, respectively, the ultrasonic driver is a piezoelectric plate, and both ends of the ultrasonic driver are fixed to the two connecting bridges, respectively; and wherein the FPC is further provided with a first line to be led out for the ultrasonic driver and a second line to be led out for the voice coil, the first line is led out from the connecting bridges to the outer border via the inner border and the elastic arms, and the second line is led out from the inner border to the outer border via the elastic arms.

2. The ultrasonic loudspeaker according to claim 1, wherein portions of the two connecting bridges connected to the ultrasonic driver are sunk at a depth equal to a thickness of the ultrasonic driver.

3. The ultrasonic loudspeaker according to claim 1, wherein a reinforcement plate is further provided between the FPC and the diaphragm, one surface of the reinforcement plate is attached and connected to the diaphragm, and the other surface of the reinforcement plate is attached and connected to the inner border and the ultrasonic driver at the same time.

4. The ultrasonic loudspeaker according to claim 1, wherein connecting electrodes for connection with the first line and the second line are further disposed on the frame by integral injection molding, and the connecting electrodes extend from an upper surface of the frame to a lower surface of the frame.

5. He ultrasonic loudspeaker according to claim 1, wherein the magnetic circuit system comprises magnetic steel, a magnetic bowl and a pole piece, the magnetic bowl is fixed on the frame, and a vibration space allowing for vibration of the voice coil is formed between the magnetic bowl and the magnetic steel.

6. He ultrasonic loudspeaker according to claim 5, wherein a side wall of the magnetic bowl is upturned and extends to a plane where the pole piece is located.

7. The ultrasonic loudspeaker according to claim 5, wherein a surface of the pole piece facing the FPC is provided with recesses allowing for vibration of the ultrasonic driver.

* * * * *